US012723157B2

(12) United States Patent
Chon

(10) Patent No.: US 12,723,157 B2
(45) Date of Patent: Sep. 1, 2026

(54) CURABLE SILICONE COMPOSITION AND CURED PRODUCT THEREOF

(71) Applicant: DOW SILICONES CORPORATION, Midland, MI (US)

(72) Inventor: Jina Chon, Chungcheongbuk-do (KR)

(73) Assignee: DOW SILICONES CORPORATION, Midland, MI (US)

( * ) Notice: Subject to any disclaimer, the term of this patent is extended or adjusted under 35 U.S.C. 154(b) by 611 days.

(21) Appl. No.: 18/028,725

(22) PCT Filed: Sep. 27, 2021

(86) PCT No.: PCT/US2021/052167
§ 371 (c)(1),
(2) Date: Mar. 27, 2023

(87) PCT Pub. No.: WO2022/072271
PCT Pub. Date: Apr. 7, 2022

(65) Prior Publication Data

US 2024/0018308 A1 Jan. 18, 2024

Related U.S. Application Data

(60) Provisional application No. 63/084,890, filed on Sep. 29, 2020.

(51) Int. Cl.

| | |
|---|---|
| ***C08L 83/06*** | (2006.01) |
| ***C08G 77/00*** | (2006.01) |
| ***C08G 77/14*** | (2006.01) |
| ***C08K 5/5435*** | (2006.01) |
| ***C09D 183/06*** | (2006.01) |
| *C08J 3/24* | (2006.01) |
| *C08J 3/28* | (2006.01) |

(52) U.S. Cl.
CPC .............. *C08L 83/06* (2013.01); *C08G 77/14* (2013.01); *C08G 77/80* (2013.01); *C08K 5/5435* (2013.01); *C09D 183/06* (2013.01); *C08J 3/243* (2013.01); *C08J 3/28* (2013.01); *C08L 2201/10* (2013.01); *C08L 2205/025* (2013.01); *C08L 2312/06* (2013.01)

(58) Field of Classification Search
CPC . C08L 2205/025; C08L 83/06; C09D 183/06; C08G 59/68; C08G 59/687; C08J 3/243; C08J 3/28
USPC ..................................................... 522/25, 27
See application file for complete search history.

(56) References Cited

U.S. PATENT DOCUMENTS 4,698,386 A 10/1987 Fujimoto
4,788,240 A 11/1988 Fujimoto
4,987,158 A 1/1991 Eckberg
5,360,853 A 11/1994 Nagata et al.
5,936,110 A 8/1999 Yoshitake et al.
5,952,439 A 9/1999 Morita et al.
5,959,038 A 9/1999 Furukawa et al.
5,965,637 A 10/1999 Pfander et al.
6,180,712 B1 1/2001 Ishikawa et al.
6,828,355 B1 12/2004 Chu
7,844,153 B2 11/2010 Watanabe et al.
7,964,248 B2 6/2011 Fong et al.
10,464,943 B2 11/2019 Takata et al.
2001/0034403 A1 10/2001 Takuman et al.
2002/0156187 A1 10/2002 Greene
2004/0102563 A1 5/2004 Schottland et al.
2004/0265599 A1 12/2004 Ushio et al.
2005/0170187 A1* 8/2005 Ghoshal ................ C08G 59/38
525/476
2005/0282959 A1 12/2005 Ahn et al.
2006/0205861 A1 9/2006 Gordon et al.
2007/0275255 A1 11/2007 Ooms et al.
2007/0287765 A1 12/2007 Busch et al.
2007/0287771 A1 12/2007 Yamazaki et al.
2008/0176086 A1 7/2008 Irifune
2008/0260337 A1 10/2008 Bahadur et al.
2009/0105441 A1 4/2009 Ushio et al.
2009/0294023 A1 12/2009 Berger et al.
2010/0069523 A1 3/2010 Alvarez et al.
2010/0103507 A1 4/2010 Imazawa et al.
2010/0120975 A1 5/2010 Kuroda et al.
2012/0220681 A1 8/2012 Bae et al.
(Continued)

FOREIGN PATENT DOCUMENTS

CN 1622940 A 6/2005
CN 1719338 A 1/2006
(Continued)

OTHER PUBLICATIONS

J. K. Puri et al.: "Silatranes: a review on their synthesis, structure, reactivity and applications", Chem. Soc. Rev., vol. 40, No. 3, Jan. 1, 2011 (Jan. 1, 2011), pp. 1791-1840.
(Continued)

*Primary Examiner* — Marc S Zimmer

(74) *Attorney, Agent, or Firm* — Warner Norcross + Judd LLP

(57) ABSTRACT

A curable silicone composition is provided. The composition comprises: (A) an epoxy-functional silicone resin having monovalent aromatic hydrocarbon groups; (B) an epoxy-functional silicone; and (C) a mixture of cationic photoinitiators comprising: (C-1) an iodonium salt type cationic photoinitiator and (C-2) a sulfonium salt type cationic photoinitiator. The composition has excellent curability with UV radiation, and further with heating, generally forms a cured product with excellent transparency.

8 Claims, No Drawings

(56) References Cited

U.S. PATENT DOCUMENTS

| | | | | |
|---|---|---|---|---|
| 2013/0203882 | A1 | 8/2013 | Cherkaoui et al. | |
| 2013/0235515 | A1 | 9/2013 | Ouderkirk et al. | |
| 2013/0331476 | A1 | 12/2013 | Bae et al. | |
| 2014/0154626 | A1 | 6/2014 | Bujalski et al. | |
| 2014/0205949 | A1 | 7/2014 | Hara et al. | |
| 2014/0238580 | A1 | 8/2014 | Zhang et al. | |
| 2014/0342100 | A1 | 11/2014 | Valeri | |
| 2015/0064432 | A1 | 3/2015 | Matsuyuki et al. | |
| 2015/0334587 | A1 | 11/2015 | Kim et al. | |
| 2017/0010529 | A1 | 1/2017 | Aoyagi | |
| 2017/0204231 | A1 | 7/2017 | Tsukao et al. | |
| 2017/0267703 | A1 | 9/2017 | Kusunoki et al. | |
| 2018/0334587 | A1 | 11/2018 | Betzig et al. | |
| 2019/0136041 | A1 | 5/2019 | Matsuoka | |
| 2019/0144704 | A1 | 5/2019 | Kawamura et al. | |
| 2019/0185710 | A1 | 6/2019 | Mulzer et al. | |
| 2020/0048462 | A1 * | 2/2020 | Ahn | C08G 77/14 |
| 2020/0056056 | A1 | 2/2020 | Ahn et al. | |
| 2020/0199403 | A1 | 6/2020 | Liu et al. | |
| 2020/0325337 | A1 | 10/2020 | Prasse et al. | |
| 2023/0046737 | A1 | 2/2023 | Chon | |
| 2023/0365757 | A1 | 11/2023 | Chon | |
| 2024/0158580 | A1 | 5/2024 | Lee | |
| 2024/0279400 | A1 | 8/2024 | Chon | |

FOREIGN PATENT DOCUMENTS

| | | | | | |
|---|---|---|---|---|---|
| CN | 102234428 | A | | 11/2011 | |
| CN | 106800655 | A | | 6/2017 | |
| CN | 108102277 | A | | 6/2018 | |
| CN | 108192283 | A | | 6/2018 | |
| CN | 110857340 | A | | 3/2020 | |
| CN | 111057377 | A | * | 4/2020 | |
| CN | 111393586 | A | | 7/2020 | |
| CN | 112795347 | A | | 5/2021 | |
| EP | 0908462 | A2 | | 4/1999 | |
| EP | 1099737 | A1 | | 5/2001 | |
| EP | 1134256 | A1 | | 9/2001 | |
| EP | 1136533 | A1 | | 9/2001 | |
| EP | 2363430 | A1 | | 9/2011 | |
| EP | 2772505 | A1 | | 9/2014 | |
| JP | H09124976 | A | | 5/1997 | |
| JP | H10195085 | A | | 7/1998 | |
| JP | H11279182 | A | | 10/1999 | |
| JP | 2004176011 | A | | 6/2004 | |
| JP | 2004196977 | A | | 7/2004 | |
| JP | 2009298887 | A | | 12/2009 | |
| JP | 2012171983 | A | | 9/2012 | |
| JP | 2013095874 | A | | 5/2013 | |
| JP | 2015199815 | A | | 11/2015 | |
| JP | 2016210879 | A | | 12/2016 | |
| JP | 2018111792 | A | | 7/2018 | |
| KR | 20170113220 | A | | 10/2017 | |
| WO | 2003062208 | A1 | | 7/2003 | |
| WO | 2008078663 | A1 | | 7/2008 | |
| WO | WO-2017175735 | A1 | * | 10/2017 | C08G 59/24 |
| WO | 2019003991 | A1 | | 1/2019 | |
| WO | 2021127246 | A1 | | 6/2021 | |

OTHER PUBLICATIONS

Machine assisted English translation of CN108102277A obtained from https://patents.google.com/patent on Feb. 14, 2024, 4 pages.

Machine assisted English translation of CN111393586A obtained from https://patents.google.com/patent on Feb. 14, 2024, 5 pages.

Machine assisted English translation of CN1719338A obtained from https://patents.google.com/patent on Feb. 14, 2024, 6 pages.

Machine assisted English translation of JP2004196977A obtained from https://patents.google.com/patent on Feb. 14, 2024, 21 pages.

International Search Report for PCT/US2021/052167 dated Jan. 20, 2022, 6 pages.

* cited by examiner

CURABLE SILICONE COMPOSITION AND CURED PRODUCT THEREOF

The application is the U.S. National Stage of PCT/US2021/052167 filed on 27 Sep. 2021, which claims priority to and all advantages of U.S. Provisional Patent Application No. 63/084,890 filed on 29 Sep. 2020, the content of which is incorporated herein by reference.

TECHNICAL FIELD

The present invention relates to a curable silicone composition and a cured product thereof.

BACKGROUND ART

Epoxy-functional silicones are used for curable silicone compositions which can be cured by irradiation with ultraviolet ("UV") ray. For example, Patent Document 1 discloses a curable silicone composition comprising: an epoxy-functional silicone resin represented by the average unit formula: $(R_3SiO_{1/2})_i(R_2SiO_{2/2})_{ii}(RSiO_{3/2})_{iii}(SiO_{4/2})_{iv}$, wherein each R is an organic group is independently selected from $C_{1-6}$ monovalent aliphatic hydrocarbon group, $C_{6-10}$ monovalent aromatic hydrocarbon group, and a monovalent epoxy-substituted organic group; 0≤i<0.4, 0<ii<0.5, 0<iii<1, O≤iv<0.4, 0.1≤ii/iii≤0.3, i+ii+iii+iv=1, the resin has a number-average molecular weight of at least about 2,000, at least about 15 mol % of the organic groups are $C_{6-10}$ monovalent aromatic hydrocarbon groups, and about 2 to about 50 mol % of siloxane units have epoxy-substituted organic groups; an epoxy-functional silicone oligomer represented by the general formula: R"R'$_2$SiO(R'$_2$SiO)vSiR'$_2$R", wherein each R' is $C_{1-8}$ alkyl group, each R" is an epoxy-substituted organic group, "v" is 0 or a positive integer; and a cationic photoinitiator, wherein the composition can be cured by irradiation with UV ray.

However, such a curable silicone composition has a problem that the composition is not sufficiently cured, or a cured product has poor transparency and mechanical properties.

Therefore, it is desired to develop a curable silicone composition with excellent curability with UV radiation, and further with heating, to form a cured product with good transparency.

CITATION LIST

Patent Literature

Patent Document 1: United States Patent Application Publication No. 2014/154626 A1

SUMMARY OF INVENTION

Technical Problem

An objective of the present invention is to provide a curable silicone composition with excellent curability with UV radiation, and further with heating, to form a cured product with good transparency. Another objective of the present invention is to provide a cured product with excellent transparency.

Solution to Problem

The curable silicone composition of the present invention comprises:

(A) an epoxy-functional silicone resin represented by the following average unit formula:

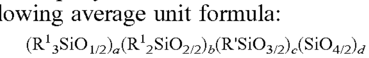

$$(R^1_3SiO_{1/2})_a(R^1_2SiO_{2/2})_b(R'SiO_{3/2})_c(SiO_{4/2})_d$$

wherein each $R^1$ is the same or different organic group selected from a $C_{1-6}$ monovalent aliphatic hydrocarbon group, $C_{6-10}$ monovalent aromatic hydrocarbon group, and a monovalent epoxy-substituted organic group, provided that at least about 15 mol % of the total $R^1$ are the $C_{6-10}$ monovalent aromatic hydrocarbon groups; and "a", "b", "c" and "d" are numbers that satisfy the following conditions: 0≤a<0.4, 0<b<0.5, 0<c<1, 0.1≤b/c≤0.6, and a+b+c+d=1; and about 2 to about 30 mol % of the total siloxane units have the monovalent epoxy-substituted organic groups;

(B) an epoxy-functional silicone represented by the following general formula:

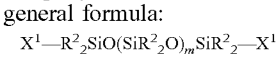

$$X^1—R^2_2SiO(SiR^2_2O)_mSiR^2_2—X^1$$

wherein each $R^2$ is the same or different organic group selected from a $C_{1-6}$ monovalent aliphatic hydrocarbon group and a $C_{6-10}$ monovalent aromatic hydrocarbon group; each X1 is the same or different group selected from a monovalent epoxy-substituted organic group and an epoxy-functional siloxy group represented by the following general formula:

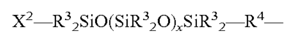

$$X^2—R^3_2SiO(SiR^3_2O)_xSiR^3_2—R^4—$$

wherein each $R^3$ is the same or different $C_{1-6}$ monovalent aliphatic hydrocarbon group; $R^4$ is a $C_{2-6}$ alkylene group; $X^2$ is a monovalent epoxy-substituted organic group; and "x" is a number of from about 0 to about 5, and "m" is a number of from about 0 to about 100, in an amount of from about 5 mass % to about 40 mass % of the total mass of components (A), (B) and (C); and (C) a mixture of cationic photoinitiators comprising: (C-1) an iodonium salt type cationic photoinitiator and (C-2) a sulfonium salt type cationic photoinitiator, in an amount of from about 0.2 mass % to about 2 mass % of the total mass of components (A), (B) and (C).

In various embodiments, the monovalent epoxy-substituted organic groups in component (A) are groups selected from glycidoxyalkyl groups, 3,4-epoxycyclohexylalkyl groups, and epoxyalkyl groups.

In various embodiments, the monovalent epoxy-substituted organic groups in component (B) are groups selected from glycidoxyalkyl groups, 3,4-epoxycyclohexylalkyl groups, and epoxyalkyl groups.

In various embodiments, component (C-1) is typically an iodonium salt type cationic photoinitiator having a structure represented by the following general formula:

$$R^c_2I^+X^-$$

wherein, each $R^c$ is the same or different $C_{1-6}$ alkyl group, $C_{6-24}$ aryl group, or substituted $C_{6-24}$ aryl groups; and $X^-$ is a non-nucleophilic non-basic anion.

In various embodiments, component (C-2) is typically a sulfonium salt type cationic photoinitiator having a structure represented by the formula:

$$R^c_3S^+X^-$$

or a sulfonium salt type cationic photoinitiator having a structure represented by the formula:

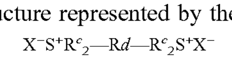

$$X^-S^+R^c_2—Rd—R^c_2S^+X^-$$

wherein, each $R^c$ and $X^-$ is the same as described above, and $R^d$ is an unsubstituted or heteroatom-substituted divalent hydrocarbon group.

In various embodiments, a mass ratio of component (C-1):component (C-2) is typically in a range of from 1:10 to 10:1.

In various embodiments, the curable silicone composition further comprises: (D) an adhesion promoter, in an amount of from about 0.01 to about 5 mass % of the total mass of components (A), (B), (C) and (D).

The cured product of the present invention is obtained by curing the curable silicone composition described above.

Effects of Invention

The curable silicone composition of the present invention has excellent curability with UV radiation, and further with heating to form a cured product with excellent transparency. While, the cured product of the present invention has excellent transparency.

DETAILED DESCRIPTION OF THE INVENTION

The terms "comprising" or "comprise" are used herein in their broadest sense to mean and encompass the notions of "including," "include," "consist(ing) essentially of," and "consist(ing) of". The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, 0-10, 0-5, or ±0-2.5, % of the numerical values. Further, the term "about" applies to both numerical values when associated with a range of values. Moreover, the term "about" may apply to numerical values even when not explicitly stated. Generally, as used herein a ">" is "above" or "greater-than"; a "≥" is "at least" or "greater-than or equal to"; a "<" is "below" or "less-than"; and a "≤" is "at most" or "less-than or equal to."

The terms "epoxy-functional" or "epoxy-substituted" as used herein refers to a functional group in which an oxygen atom, the epoxy substituent, is directly attached to two adjacent carbon atoms of a carbon chain or ring system. Examples of epoxy-substituted functional groups include, but are not limited to, glycidoxyalkyl groups such as 2-glycidoxyethyl groups, 3-glycidoxypropyl groups, 4-glycidoxybutyl groups or the like; (3,4-epoxycycloalkyl)alkyl groups such as 2-(3,4-epoxycylohexyl)ethyl groups, 3-(3,4-epoxycylohexyl)propyl groups, 2-(3,4-epoxy-3-methylcylohexyl)-2-methylethyl groups, 2-(2,3-epoxycylopentyl)ethyl groups, 3-(2,3-epoxycylopentyl)propyl groups, and the like; and epoxyalkyl groups such as 2,3-epoxypropyl groups, 3,4-epoxybutyl groups, 4,5-epoxypentyl groups, and the like.

<Curable Silicone Composition>

Component (A) is an epoxy-functional silicone resin represented by the following average siloxane unit formula:

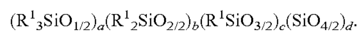

$$(R^1_3SiO_{1/2})_a(R^1_2SiO_{2/2})_b(R^1SiO_{3/2})_c(SiO_{4/2})_d.$$

In the formula, each $R^1$ is the same or different organic group selected from a $C_{1-6}$ monovalent aliphatic hydrocarbon group, $C_{6-10}$ monovalent aromatic hydrocarbon group, and a monovalent epoxy-substituted organic group.

Examples of the $C_{1-6}$ monovalent aliphatic hydrocarbon groups in component (A) include $C_{1-6}$ alkyl groups such as methyl groups, ethyl groups, propyl groups, butyl group, and hexyl groups; $C_{2-6}$ alkenyl groups such as vinyl groups, allyl groups, and hexenyl groups; and $C_{1-6}$ halogenated alkyl groups such as 3-chloropropyl groups and 3,3,3-trifluoropropyl groups. Among these, methyl groups are generally preferred.

Examples of the $C_{6-10}$ monovalent aromatic hydrocarbon groups in component (A) include phenyl groups, tolyl groups, xylyl groups, and naphthyl groups. Among these, phenyl groups are generally preferred.

Examples of the monovalent epoxy-substituted organic groups in component (A) include glycidoxyalkyl groups such as 3-glycidoxypropyl groups, 4-glycidoxybutyl groups and 5-glycidoxypentyl groups; 3,4-epoxycycloalkyl alkyl groups such as 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3-epoxycylopentyl)propyl; and epoxyalkyl groups such as 2,3-epoxypropyl groups, 3,4-epoxybutyl groups, and 4,5-epoxypentyl groups. Among these, 3,4-epoxycycloalkyl alkyl groups are generally preferred.

In component (A), at least about 15 mol %, optionally at least about 20 mol %, or optionally at least about 25 mol %, of the total $R^1$ are the $C_{6-10}$ monovalent aromatic hydrocarbon groups. If the content of the monovalent aromatic hydrocarbon groups is greater than or equal to the lower limit described above, the optical transmittance of the cured product can increase as well as mechanical properties thereof increase.

In the formula, "a", "b", "c", and "d" are mole fractions and numbers that satisfy the following conditions: $0 \le a < 0.4$, $0 < b < 0.5$, $0 < c < 1$, $0 \le d < 0.4$, $0.1 \le b/c \le 0.6$, and $a+b+c+d=1$, optionally $a=0$, $0 < b < 0.5$, $0 < c < 1$, $0 \le d < 0.2$, $0.1 < b/c \le 0.6$, and $b+c+d=1$, or optionally $a=0$, $0 < b < 0.5$, $0 < c < 1$, $d=0$, $0.1 < b/c \le 0.6$, and $b+c=1$. "a" is $0 \le a < 0.4$, optionally $0 \le a < 0.2$, or optionally $a=0$, because the molecular weight of the epoxy-containing organopolysiloxane resin (A) drops when there are too many $(R^1_3SiO_{1/2})$ siloxane units, and, when $(SiO_{4/2})$ siloxane units are introduced, the hardness of the cured product of the epoxy-functional silicone resin (A) is markedly increased and the product can be easily rendered brittle. For this reason, "d" is $0 \le d < 0.4$, optionally $0 \le d < 0.2$, or optionally $d=0$. In addition, the molar ratio "b/c" of the $(R^1_2SiO_{2/2})$ units and $(R^1SiO_{3/2})$ units can be not less than about 0.1 and not more than about 0.6. In some examples, deviation from this range in the manufacture of the epoxy-functional silicone resin (A) can result in generation of insoluble side products, in making the product more prone to cracking due to decreased toughness, or in a decrease in the strength and elasticity of the product and making it more prone to scratching. In some examples, the range molar ratio "b/c" is more than about 0.1 and not more than about 0.6. The epoxy-functional silicone resin (A) contains the $(R^1_2SiO_{2/2})$ siloxane units and the $(R^1SiO_{3/2})$ siloxane units, and its molecular structure is in most cases a network structure or a three-dimensional structure because the molar ratio of "b/c" is more than about 0.1 and not more than about 0.6. Thus, in the epoxy-functional silicone resin (A), the $(R^1_2SiO_{2/2})$ siloxane units and the $(R^1SiO_{3/2})$ siloxane units are present, whereas the $(R^1_3SiO_{1/2})$ siloxane units and the $(SiO_{4/2})$ siloxane units are optional constituent units. That is, there can be epoxy-functional silicone resins including the following average unit formulas:

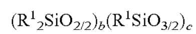

$$(R^1_2SiO_{2/2})_b(R^1SiO_{3/2})_c$$

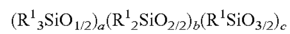

$$(R^1_3SiO_{1/2})_a(R^1_2SiO_{2/2})_b(R^1SiO_{3/2})_c$$

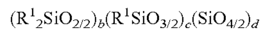

$(R^1{}_2SiO_{2/2})_b(R^1SiO_{3/2})_c(SiO_{4/2})_d$

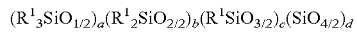

$(R^1{}_3SiO_{1/2})_a(R^1{}_2SiO_{2/2})_b(R^1SiO_{3/2})_c(SiO_{4/2})_d$

In component (A), about 2 to about 30 mol % of siloxane units, optionally about 10 mol % to about 30 mol %, or optionally about 15 mol % to about 30 mol %, of all the siloxane units in a molecule have epoxy-substituted organic groups. If there is greater than or equal to the lower limit of the range mentioned above of such siloxane units, the density of cross-linking during curing can increase. On the other hand, the amount is less than or equal to the upper limit of the range mentioned above can be suitable because it can bring about an increase in the optical transmittance and heat resistance of the cured product. In the epoxy-functional monovalent hydrocarbon groups, the epoxy groups can be bonded to silicon atoms through alkylene groups, such that these epoxy groups are not directly bonded to the silicon atoms. The epoxy-functional silicone resin (A) can be produced by well-known conventional manufacturing methods.

While there are no particular limitations concerning the weight-average molecular weight of the epoxy-functional silicone resin (A), if the toughness of the cured product and its solubility in organic solvents are taken into consideration, in some embodiments the molecular weight is not less than about $10^3$ and not more than about $10^6$. In one embodiment, the epoxy-functional silicone resin (A) includes a combination of two or more kinds of such epoxy-functional silicone resins with different content and type of the epoxy-containing organic groups and monovalent hydrocarbon groups or with different molecular weights.

Component (B) is an epoxy-functional silicone represented by the following general formula:

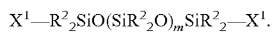

$X^1—R^2{}_2SiO(SiR^2{}_2O)_mSiR^2{}_2—X^1$.

In the formula, each $R^2$ is the same or different organic group selected from a $C_{1-6}$ monovalent aliphatic hydrocarbon group and a $C_{6-10}$ monovalent aromatic hydrocarbon group.

Examples of the $C_{1-6}$ monovalent aliphatic hydrocarbon groups in component (B) include $C_{1-6}$ alkyl groups such as methyl groups, ethyl groups, propyl groups, butyl group, and hexyl groups; $C_{2-6}$ alkenyl groups such as vinyl groups, allyl groups, and hexenyl groups; and $C_{1-6}$ halogenated alkyl groups such as 3-chloropropyl groups and 3,3,3-trifluoropropyl groups. Among these, methyl groups are generally preferred.

Examples of the $C_{6-10}$ monovalent aromatic hydrocarbon groups in component (B) include phenyl groups, tolyl groups, xylyl groups, and naphthyl groups. Among these, phenyl groups are generally preferred.

In the formula, each $X^1$ is the same or different group selected from a monovalent epoxy-substituted organic group and an epoxy-functional siloxy group represented by the following general formula:

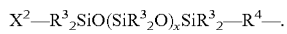

$X^2—R^3{}_2SiO(SiR^3{}_2O)_xSiR^3{}_2—R^4—$.

Examples of the monovalent epoxy-substituted organic groups for $X^1$ include glycidoxyalkyl groups such as 3-glycidoxypropyl groups, 4-glycidoxybutyl groups and 5-glycidoxypentyl groups; 3,4-epoxycycloalkyl alkyl groups such as 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3-epoxycylopentyl)propyl; and epoxyalkyl groups such as 2,3-epoxypropyl groups, 3,4-epoxybutyl groups, and 4,5-epoxypentyl groups. Among these, 3,4-epoxycycloalkyl alkyl groups are generally preferred.

In the general formula above, each $R^3$ is the same or different $C_{1-6}$ monovalent aliphatic hydrocarbon group. Examples of the $C_{1-6}$ monovalent aliphatic hydrocarbon groups for $R^3$ include $C_{1-6}$ alkyl groups such as methyl groups, ethyl groups, propyl groups, butyl group, and hexyl groups; $C_{2-6}$ alkenyl groups such as vinyl groups, allyl groups, and hexenyl groups; and $C_{1-6}$ halogenated alkyl groups such as 3-chloropropyl groups and 3,3,3-trifluoropropyl groups. Among these, methyl groups are generally preferred.

In the general formula above, $R^4$ is a $C_{2-6}$ alkylene group. Examples of the $C_{2-6}$ alkylene groups for $R^4$ include ethylene groups, methylethylene groups, propylene groups, butylene group, and hexylene groups. Among these, ethylene groups are generally preferred.

In the general formula above, $X^2$ is a monovalent epoxy-substituted organic group. Examples of the monovalent epoxy-substituted organic groups for $X^2$ include glycidoxyalkyl groups such as 3-glycidoxypropyl groups, 4-glycidoxybutyl groups and 5-glycidoxypentyl groups; 3,4-epoxycycloalkyl alkyl groups such as 2-(3,4-epoxycylohexyl)ethyl, 3-(3,4-epoxycylohexyl)propyl, 2-(3,4-epoxy-3-methylcylohexyl)-2-methylethyl, 2-(2,3-epoxycylopentyl)ethyl, and 3-(2,3-epoxycylopentyl)propyl; and epoxyalkyl groups such as 2,3-epoxypropyl groups, 3,4-epoxybutyl groups, and 4,5-epoxypentyl groups. Among these, 3,4-epoxycycloalkyl alkyl groups are generally preferred.

In the general formula above, 'x' is a number of from about 0 to about 5, optionally from about 0 to about 2, or optionally about 0.

In the general formula above, "m" is a number of from about 0 to about 100, optionally from about 0 to about 20, or optionally from about 0 to about 10. If "m" is less than or equal to the upper limit of the range described above, mechanical strength of the cured product can increase.

The state of component (B) at 25° C. is not limited, but it is generally a liquid. The viscosity at 25° C. of component (B) is not limited; however, the viscosity is generally in a range of from about 5 to about 100 mPa·s. Note that in the present specification, viscosity is the value measured using a type B viscometer according to ASTM D 1084 at 23±2° C.

The content of component (B) is in an amount of from about 5 mass % to about 40 mass %, optionally in an amount of from about 10 mass % to about 40 mass %, optionally in an amount of from about 10 mass % to about 35 mass %, or optionally in an amount of from 10 mass % to about 30 mass %, of the total mass of components (A), (B) and (C). If the content of component (B) is greater than or equal to the lower limit of the range described above, flexibility and impact strength of the cured product can increase. On the other hand, the content is less than or equal to the upper limit of the range described above, toughness and tensile strength of the cured product can increase.

Component (C) is a cationic photoinitiator used as a photoinitiator for epoxy-functional silicone, and a mixture of cationic photoinitiators comprising: (C-1) an iodonium salt type cationic photoinitiator and (C-2) a sulfonium salt type cationic photoinitiator.

Iodonium salt type cationic photoinitiator for component (C-1) is not limited, but it is preferably a compound having a structure represented by the following general formula:

$R^c{}_2I^+X^-$.

In the formula, $R^c$ can stand for methyl, ethyl, propyl, butyl, and other $C_{1-6}$ alkyl groups; phenyl, naphthyl, biphenyl, tolyl, propylphenyl, decylphenyl, dodecylphenyl, and other $C_{6-24}$ aryl groups; or alkyl group, aryl group, alkoxy group, mercapto atom, oxygen atom, or other heteroatom-substituted aryl groups, and X in the formula can represent $SbF_6^-$, $AsF_6^-$, $PF_6^-$, $BF_4^-$, $B(C_6F_5)_4^-$, $HSO_4^-$, $ClO_4^-$, $CF_3SO_3^-$, nonafluorobutanesulfonate, tris (pentafluoroethyl) trifluorophosphate, tris (heptafluoropropyl) trifluorophosphate, tris (nonafluoroisobutyl) trifluoro phosphate, bis (nonafluorobutyl isobutyl) tetrafluoro phosphate, and other non-nucleophilic non-basic anions.

In the formula, each $R^c$ is preferably $C_{6-24}$ aryl group; or alkyl group or alkoxy group-substituted aryl groups. Specific examples of the cation moiety of the diaryliodonium salt include diphenyliodonium, 4-isopropyl-4'-methyldiphenyliodonium, 4-methyl-4'-methyl-propyldiphenyliodonium, bis(4-tert-butylphenyl)iodonium, 4-methoxyphenyphenyliodonium.

Specific examples of the iodonium salt type cationic photoinitiator include compounds represented by the following formulas:

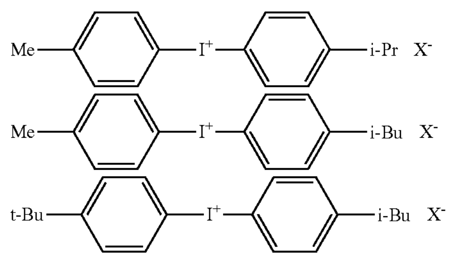

In the formulae above, “Me”, “i-Pr,” and “t-Bu” respectively indicates methyl group, iso-propyl group, and tert-butyl group; and X is the same as mentioned above.

Specific trade names of the Iodonium salt type cationic photoinitiator include TR-PAG-30101, 30201, 30408, 30401s, and 31102 (manufactured by TRONYL), and the like.

While, sulfonium salt type cationic photoinitiator for component (C-2) is not limited, but it is preferably a compound having a structure represented by the formula:

$R^c_3S^+X^-$ or a compound having a structure represented by the formula:

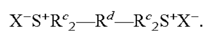

$X^-S^+R^c_2—R^d—R^c_2S^+X^-$.

In the formula, each $R^c$ and $X^-$ is the same as described above.

In the formula, $R^d$ can stand for an unsubstituted or heteroatom-substituted divalent hydrocarbon group such as methylene, ethylene, propylene, butylene, and other $C_{1-6}$ alkylene groups; phenylene, naphthylene, biphenylene, tolylene, propylphenylene, decylphenylene, dodecylphenylene, and other $C_{6-24}$ arylene groups; and phenyl-thiophenylene groups phenylene-oxy-phenylene group, or mercapto, oxygen, or other heteroatom-substituted divalent hydrocarbon groups.

Specific examples of the cation moiety of the triarylsulfonium salt include triphenylsulfonium, diphenyl-4-methylphenylsulfonium, tris(4-methylphenyl)sulfonium, diphenyl-2,4,6-trimethylphenylsulfonium, and 4-(phenylthio) phenyldiphenylsulfonium.

In the formula, each $R^c$ is preferably $C_{6-24}$ aryl group; or alkyl group, aryl group, or mercapto-substituted aryl groups, and $R^d$ is preferably a thio-substituted divalent group.

Examples of the iodonium salt type cationic photoinitiator include compounds represented by the following formulas:

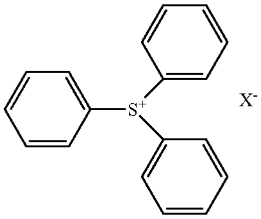

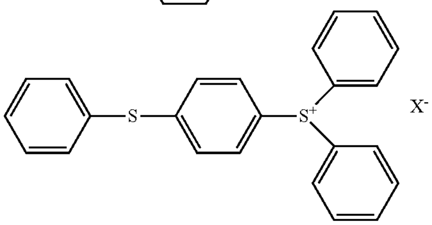

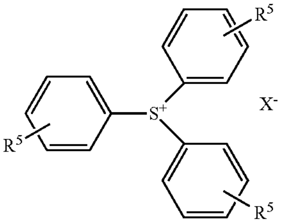

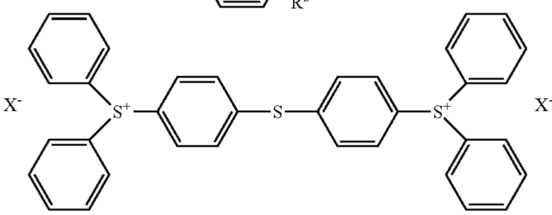

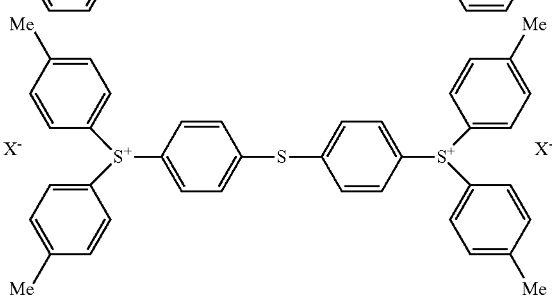

In the formula above, “Me” indicates methyl group; $X^-$ is the same as mentioned above, and each $R^5$ is the same or different alkyl group, aryl group, alkoxy group; or mercapto atom, oxygen atom, or other heteroatom-containing organic group.

Specific trade names of the sulfonium salt type cationic photoinitiator include CPI (Trademark)-100P, 101A, 200K, 210S, 310B, 410S (manufactured by Sunapro Inc.), CPI-310B, TR-PAG-21608 (manufactured by TRONYL), and the like.

In component (C), a mass ratio of component (C-1): component (C-2) is not limited, but it is typically in a range of from 1:10 to 10:1, or alternatively in a range of from 1:5 to 5:1. This is because when the mass ratio is within the aforementioned range, the composition exhibits excellent curability with UV radiation, and further with heating.

Moreover, as long as the object of the present invention is not impaired, the present composition may comprise: a cationic photoinitiator other than components (C-1) and (C-2). Other cationic photoinitiator that is known by one of skill in the art can be used, such as selenonium salts, phosphonium salts, diazonium salts, para-toluene sulfonates, trichloromethyl-substituted triazines, and trichloromethyl-substituted benzenes. Examples of selenonium salts can include salts represented by the formula: $R^c_3Se^+X^-$; examples of phosphonium salts can include salts represented by the formula: $R^c_4P^+X^-$; examples of diazonium salts can include salts represented by the formula: $R^cN_2^+X^-$; with the $R^c$ and $X^-$ in the formulas being the same as described herein for $R^c_3S^+X^-$; examples of para-toluene sulfonates can include compounds represented by the formula: $CH_3C_6H_4SO_3R^{c1}$, with the $R^{c1}$ in the formula standing for organic groups including electron-attracting groups, such as benzoylphenylmethyl groups, phthalimide groups, and the like. Examples of trichloromethyl-substituted triazines can include compounds represented by $[CC1_3]_2C_3N_3R^{c2}$, with the $R^{c2}$ in the formula standing for phenyl, substituted or unsubstituted phenylethyl, substituted or unsubstituted furanylethynyl, and other electron-attracting groups. Examples of trichloromethyl-substituted benzenes can include compounds represented by $CCl_3C_6H_3R^cR^{c3}$, with the $R^c$ in the formula being the same as described herein for $R^c_3S^+X^-$ and the $R^{c3}$ standing for halogen groups, halogen-substituted alkyl groups, and other halogen-containing groups.

Examples of the photoinitiator can include, for example, triphenylsulfonium tetrafluoroantimonate, di(p-tertiary butylphenyl)iodonium hexafluoroantimonate, bis(dodecylphenyl)iodonium hexafluoroantimonate, 4-isopropyl-4'-methyldiphenyliodonium tetrakis(pentafluorophenyl)borate salt, and p-chlorophenyldiazonium tetrafluoroborate.

The content of component (C) is in an amount of from about 0.2 mass % to about 2 mass %, optionally in an amount of from about 0.2 mass % to about 1 mass %, or optionally in an amount of from about 0.2 mass % to about 0.8 mass %, of the total mass of components (A), (B) and (C). If the content of component (C) is greater than or equal to the lower limit of the range described above, the curable silicone composition is cured fully. On the other hand, the content is less than or equal to the upper limit of the range described above, optical performance of the cured product can increase.

The present composition comprises components (A) to (C) described above; however, to impart better mechanical strength to a cured product of the present composition, (D) an adhesion promoter, and/or a photosensitizer, and/or an alcohol, and/or an inorganic filler can be contained.

Component (D) is an adhesion promoter. Examples of adhesion promoters include epoxy-functional alkoxysilane such as 3-glycidoxypropyltrimethoxysilane, 3-glycidoxypropyltriethoxysilane, 2-(3,4-epoxycyclohexyl)ethyldimethoxysilane, 2-(3,4-epoxycyclohexyl)ethyldiethoxysilane and combinations thereof; unsaturated alkoxysilanes such as vinyltrimethoxysilane, allyltrimethoxysilane, allyltriethoxysilane, hexenyltrimethoxysilane, undecylenyltrimethoxysilane, 3-methacryloyloxypropyl trimethoxysilane, 3-methacryloyloxypropyl triethoxysilane, 3-acryloyloxypropyl trimethoxysilane, 3-acryloyloxypropyl triethoxysilane, and combinations thereof; an epoxy-functional siloxane with silicon atom-bonded alkoxy groups such as a reaction product of a hydroxy-terminated polyorganosiloxane with an epoxy-functional alkoxysilane (e.g. such as one of those described above), or a physical blend of the hydroxy-terminated polyorganosiloxane with the epoxy-functional alkoxysilane. The adhesion promoter may comprise a combination of an epoxy-functional alkoxysilane and an epoxy-functional siloxane. For example, the adhesion promoter is exemplified by a mixture of 3-glycidoxypropyltrimethoxysilane and a reaction product of hydroxy-terminated methylvinylsiloxane with 3-glycidoxypropyltrimethoxysilane, or a mixture of 3-glycidoxypropyltrimethoxysilane and a hydroxy-terminated methylvinylsiloxane, or a mixture of 3-glycidoxypropyltrimethoxysilane and a hydroxy-terminated methylvinyl/dimethylsiloxane copolymer.

The content of component (D) is not limited, but it is generally in an amount of from about 0.01 to about 5 mass %, or optionally in an amount of from about 0.1 to about 2 mass %, of the total mass of components (A), (B), (C) and (D). If the content of component (D) is greater than or equal to the lower limit of the range described above, adhesion properties of the cured product can increase. On the other hand, it is less than or equal to the upper limit of the range described above, mechanical properties of the cured product can increase.

Examples of the photosensitizers include isopropyl-9H-thioxanthen-9-one, anthrone, 1-hydroxycyclohexyl-phenylketone, 2,4-diethyl-9H-thioxanthen-9-one, 2-isopropyl thioxanthene, 2-hydroxy-2-methyl-phenylpropan-1-one, 2,6-bis(1,1-dimethylethyl)-4-methylphenol (BHT), pentaerythritol tetrakis[3-(3,5-di-tert-butyl-4-hydroxyphenyl) propionate], thiodiethylene bis[3-(3,5-di-tert-butyl-4-hydroxyphenyl)propionate], octadecyl-3-(3,5-di-tert-butyl-4-hydroxyphenyl)propionate, 2,4-dimethyl-6-(1-methylpentadecyl)phenol, diethyl[{3,5-bis(1,1-di-tert-butyl-4-hydroxyphenyl)methyl}phosphonate, 3 3',3",5,5',5"-hexane-tert-butyl-4-a,a',a"-(mesitylene-2,4,6-tolyl)tri-p-cresol, 4,6-bis(octylthiomethyl)-o-cresol, ethylenebis (oxyethylene)bis[3-(5-tert-butyl-4-hydroxy-m-tolyl) propionate], and hexamethylene bis[3-(3,5-di-tert-butyl-4-hydroxyphenyl)propionate].

The content of the photosensitizer is not limited, but it is generally in a range of from about 0.001 to about 1 mass %, optionally in a range of from about 0.005 to about 0.5 mass %, or optionally in a range of from about 0.005 to about 0.1 mass %, of the total mass of components (A), (B), (C) and the photosensitizer. If the content of the photosensitizer is greater than or equal to the lower limit of the range described above, curability of the cured product can increase. On the other hand, it is less than or equal to the upper limit of the range described above, optical clearance of the cured product can increase.

Examples of the alcohol include monovalent alcohols such as ethyl alcohol, isopropyl alcohol, isobutyl alcohol, 1-decanol, 1-dodecanol, 1-octanol, oleyl alcohol, 1-hexadecanol, and stearyl alcohol; and multivalent alcohols such as ethylene glycol, diethylene glycol, propylene glycol, 1,10-decanediol, glycerol, and pentaerythritol.

The content of the alcohol is not limited, but it is generally in an amount of from about 0.01 to about 10 mass %, or optionally in an amount of from about 0.1 to about 10 mass %, of the total mass of components (A), (B), (C) and the alcohol.

An inorganic filler enhances mechanical strength of a cure product. Examples of the filler include one or more of finely divided treated or untreated precipitated or fumed silica; precipitated or ground calcium carbonate, zinc carbonate; clays such as finely divided kaolin; quartz powder; aluminum hydroxide; zirconium silicate; diatomaceous earth; wollastonite; pyrophylate; and metal oxides such as fumed or precipitated titanium dioxide, cerium oxide, magnesium oxide powder, zinc oxide, and iron oxide.

The content of the filler is not limited, but it is generally in a range of from about 1 to about 95 mass %, optionally in a range of from about 5 to about 95 mass %, or optionally in a range of from about 5 to about 90 mass %, of the total mass of components (A), (B), (C) and the filler.

The present composition can be cured by irradiation of UV ray (or ultraviolet ("UV") light). For example, low pressure, high pressure or ultrahigh pressure mercury lamp, metal halide lamp, (pulse) xenon lamp, or an electrodeless lamp is useful as an UV lamp. Irradiation dose is generally in a range of from about 5 to about 6,000 mJ/cm$^2$, or optionally in a range of from about 10 to about 4,000 mJ/cm$^2$.

<Cured Product>

The present composition forms a cured product when cured by irradiation with UV ray. This cured product according to the present invention has a hardness, as measured using Shore D hardness specified in ASTM D2240, in the range from at least 20 to not more than 95, typically in the range from at least 30 to not more than 80, and more typically in the range from at least 30 to not more than 70. The reasons for this are as follows: the cured product may have insufficient strength when its hardness is less than the lower limit for the cited range; when, on the other hand, the upper limit for the cited range is exceeded, the flexibility of the cured product under consideration tends to be inadequate.

In order to exhibit a satisfactory flexibility, this cured product may have an elongation as specified in ASTM D412 of at least 10%. The reason for this is that the flexibility of the cured product becomes unsatisfactory at below the indicated range.

The cured product of the present invention, because it is flexible and highly transparent, is useful as an optical member or component that is permeable to light, e.g., visible light, infrared, ultraviolet, far ultraviolet, x-ray, laser, and so forth. The cured product of the present invention is also useful as an optical member or component that must be flexible, e.g., due to use in a flexed or bent condition, and is also useful as an optical member or component for devices involved with high energy, high output light. In addition, an article or component having a flexible and highly transparent cured product layer can be made by making a composite in which the cured silicone material of the present invention is formed into a single article or body with any of various substrates, and an impact- and stress-relaxing function can also be expected from the cured product layer.

EXAMPLES

The curable silicone composition and cured product of the present invention will now be described in detail using Practical and Comparative Examples. Note that, in the formulas, "Me", "Pr", "Vi", "Ph", "Gly" and "Ep" respectively indicates methyl group, propyl group, vinyl group, phenyl group. 3-glycidoxypropyl group and 2-(3,4-epoxycyclohexyl)ethyl group. The structure of the epoxy-functional silicone resins used in the examples was determined by conducting $^{13}$C NMR and $^{29}$Si NMR measurements. The weight-average molecular weight of the epoxy-functional silicone resins was calculated using GPC based on comparison with polystyrene standards. Viscosity of epoxy-functional silicones and silicone resin was measured as follows.

<Viscosity>

Viscosity at 23±2° C. was measured by using a type B viscometer (Brookfield HA or HB Type Rotational Viscometer with using Spindle #52 at 5 rpm) according to ASTM D 1084 "Standard Test Methods for Viscosity of Adhesive".

Practical Examples 1-2 and Comparative Examples 1-3

The following components were used to prepare curable silicone compositions (mass %) shown in Table 1.

The following epoxy-functional silicone resin was used as component (A). (a1): an epoxy-functional silicone resin with a weight-average molecular weight of 2,000 to 6,000 and represented by the following average unit formula:

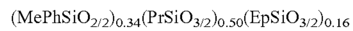

$(MePhSiO_{2/2})_{0.34}(PrSiO_{3/2})_{0.50}(EpSiO_{3/2})_{0.16}$

The following epoxy-functional silicone was used as component (B). (b1): an epoxy-functional silicone with a viscosity of 40 mPa·s, a weight-average molecular weight of 382, and represented by the following formula:

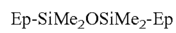

$Ep\text{-}SiMe_2OSiMe_2\text{-}Ep$

The following cationic photoinitiator was used as component (C-1). (c1): 4-isopropyl-4'-methyldiphenyliodonium tetrakis(pentafluorophenyl) borate salt represented by the following formula:

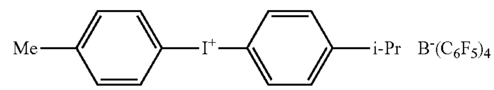 [SMILES: Cc1ccc([I+]c2ccc(C(C)C)cc2)cc1 ; "B-(C6F5)4"]

(TR-PAG-30408 from TRONYL)

The following cationic photoinitiators were used as component (C-2). (c2): a triarylsulfonium borate salt having a structure represented by the following formula:

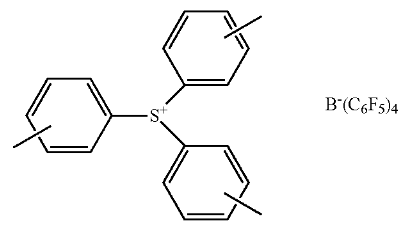

(CPI-310B from TRONYL)

(c3): a triarylsulfonium tetrakis(pentafluorophenyl) borate salt represented by the following formula:

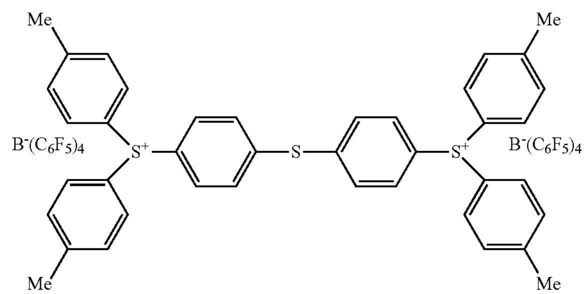 [SMILES: "B-(C6F5)4" ; Cc1ccc([S+](c2ccc(C)cc2)c2ccc(Sc3ccc([S+](c4ccc(C)cc4)c4ccc(C)cc4)cc3)cc2)cc1 ; "B-(C6F5)4"]

(TR-PAG-21608 from TRONYL)

The following component was used as component (D). (d1): a silicone resin with a viscosity of 4800 mPa·s, a weight-average molecular weight of 2,200 and represented by the following average unit formula:

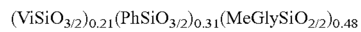

$(ViSiO_{3/2})_{0.21}(PhSiO_{3/2})_{0.31}(MeGlySiO_{2/2})_{0.48}$

The following components were used as a photosensitizer.

(e1): 2-isopropoxyl thioxanthone

<Curability of Curable Silicone Composition>

About 0.1-3 g of each curable silicone composition was loaded into a slide glass. After leveling the surface level by bar coater, it goes through Metal halide UV Lamps with D bulb in the light intensity of 5000 mW/cm$^2$ or LED 365 nm, 5000 mJ/cm$^2$ to cure the curable silicone compositions. The cured products were evaluated as follows. The properties of the cured products thereof are shown in Table 1.

○○: cured rapidly (It can be cured even in lower light intensity.)

○: cured

X: not cured

<Heat Curability at 135° C. for 1 hr.>

About 0.1-3 g of each curable silicone composition was loaded into a slide glass. After leveling the surface level by bar coater, it goes through convection oven set up 135° C. for 1 hr. to cure the curable silicone compositions. The cured products were evaluated as follows. The properties of the cured products thereof are shown in Table 1.

○○: cured rapidly (It can be cured even in lower light intensity.)

○: cured

X: not cured

<Curability in Shadow Area: UV (LED 365 nm, 5000 mJ/Cm$^2$)+Heat (135° C./1 hr.)>

About 0.1-3 g of each curable silicone composition was loaded into black acryl substrate. After leveling the surface level by bar coater, some part was covered by black acryl substrate in order to make shadow area. It goes through LED lamp 365 nm, 5000 mJ/cm$^2$, followed by heat cure (135° C./1 hr.) to cure the curable silicone compositions. The cured products in shadow area were evaluated as follows. The properties of the cured products thereof are shown in Table 1.

○○: cured rapidly (It can be cured even in lower light intensity.)

○: cured

X: not cured

<Optical Performance (Yellow Index <5)>

Samples with a thickness of about 150 microns in a sandwich glass structure were prepared. it goes through UV or heat or UV+heat to cure the curable silicone compositions. The yellow index (ASTM D1925) were measured by spectrometer. The cured products in shadow area were evaluated as follows. The properties of the cured products thereof are shown in Table 1.

○: Yellow Index<5

X: Yellow Index≥5

TABLE 1

| | | | Practical Example | | Comparative Examples | | |
|---|---|---|---|---|---|---|---|
| | | | 1 | 2 | 1 | 2 | 3 |
| Curable silicone composition (mass %) | (A) | (a1) | 74.50 | 74.50 | 74.46 | 74.50 | 74.50 |
| | (B) | (b1) | 24.00 | 24.00 | 24.00 | 24.00 | 24.00 |
| | (C) | (c1) | 0.25 | 0.25 | 0.50 | 0.50 | 0 |
| | | (c2) | 0.25 | 0 | 0 | 0 | 0.50 |
| | | (c3) | 0 | 0.25 | 0 | 0 | 0 |
| | (D) | (d1) | 1.00 | 1.00 | 1.00 | 1.00 | 1.00 |
| | (E) | (e1) | 0 | 0 | 0.04 | 0 | 0 |
| Curability | Curability @ Metal halide, D bulb, 5000 mJ/cm$^2$ | | ○ | ○ | ○ | ○ | ○ |
| | Curability @ LED 365 nm, 5000 mJ/cm$^2$ | | ○ | ○ | ○ | X | ○ |
| Heat Curability at 135° C. for 1 hr. | | | ○ | ○ | ○ | ○ | X |
| Curability in shadow area: UV(LED 365 nm, 5000 mJ/cm$^2$) + Heat (135° C./1 hr) | | | ○ | ○ | ○ | X | X |
| Optical performance (yellow index <5) | | | ○ | ○ | X | ○ | ○ |

INDUSTRIAL APPLICABILITY

The curable silicone composition of the present invention can be cured by irradiation with UV ray. Therefore, the present composition is useful as various adhesives, encapsulants, coating agents, and the like of electric/electronic parts.

The invention claimed is:

1. A curable silicone composition comprising:

(A) an epoxy-functional silicone resin represented by the following average unit formula:

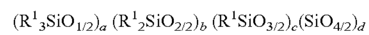

$(R^1{}_3SiO_{1/2})_a\,(R^1{}_2SiO_{2/2})_b\,(R^1SiO_{3/2})_c(SiO_{4/2})_d$ wherein each $R^1$ is the same or different organic group selected from a $C_{1-6}$ monovalent aliphatic hydrocarbon group, a $C_{6-10}$ monovalent aromatic hydrocarbon group, and a monovalent epoxy-substituted organic group, provided that at least about 15 mol % of the total $R^1$ are the $C_{6-10}$ monovalent aromatic hydrocarbon groups; and "a", "b", "c" and "d" are numbers that satisfy the following conditions: $0 \le a < 0.4$, $0 < b < 0.5$, $0 < c < 1$, $0 \le d < 0.4$, $0.1 \le b/c \le 0.6$, and $a+b+c+d=1$; and about 2 to about 30 mol % of the total siloxane units have the monovalent epoxy-substituted organic groups;

(B) an epoxy-functional silicone represented by the following general formula:

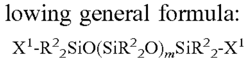

$X^1\text{-}R^2{}_2SiO(SiR^2{}_2O)_mSiR^2{}_2\text{-}X^1$ wherein each $R^2$ is the same or different organic group selected from a $C_{1-6}$ monovalent aliphatic hydrocarbon group and a $C_{6-10}$ monovalent aromatic hydrocarbon group; each $X^1$ is the same or different group selected from a monovalent epoxy-substituted organic group and an epoxy-functional siloxy group represented by the following general formula:

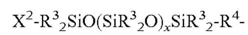

$X^2\text{-}R^3{}_2SiO(SiR^3{}_2O)_xSiR^3{}_2\text{-}R^4\text{-}$ wherein each $R^3$ is the same or different $C_{1-6}$ monovalent aliphatic hydrocarbon group; $R^4$ is a $C_{2-6}$ alkylene group; $X^2$ is a monovalent epoxy-substituted organic group; "x" is a number of from about 0 to about 5; and "m" is a number of from about 0 to about 100, in an amount of from about 5 mass % to about 40 mass % of the total mass of components (A), (B) and (C); and (C) a mixture of cationic photoinitiators comprising:

(C-1) an iodonium salt type cationic photoinitiator; and (C-2) a sulfonium salt type cationic photoinitiator; in an amount of from about 0.2 mass % to about 2 mass % of the total mass of components (A), (B) and (C);

wherein component (C-1) comprises (c1) 4-isopropyl-4'-methyldiphenyliodonium tetrakis(pentafluorophenyl) borate salt represented by the following formula:

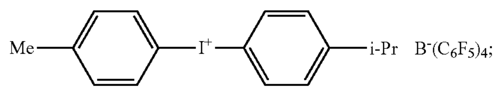

and wherein component (C-2) comprises at least one of (c2) and (c3):

(c2) a triarylsulfonium borate salt represented by the following formula:

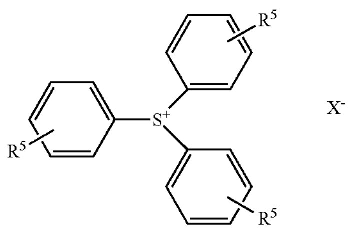

where each $R^5$ is the same or different alkyl group, aryl group, alkoxy group, or heteroatom-containing organic group, and $X^-$ is $SbF_{6-}$, $AsF_{6-}$, $PF_{6-}$, $BF_{4-}$, $B(C_6F_5)_{4-}$, $HSO_{4-}$, $ClO_{4-}$, $CF_3SO_{3-}$, nonafluorobutanesulfonate, tris (pentafluoroethyl) trifluorophosphate, tris (hepta fluoropropyl) trifluorophosphate, tris (nonafluoroisobutyl) trifluoro phosphate, or bis (nonafluorobutyl isobutyl) tetrafluoro phosphate;

(c3) a triarylsulfonium tetrakis(pentafluorophenyl) borate salt represented by the following formula

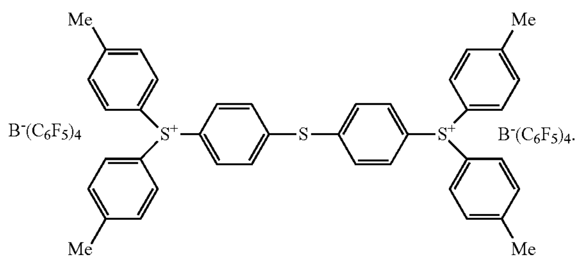

2. The curable silicone composition according to claim 1, wherein the monovalent epoxy-substituted organic groups in component (A) are groups selected from glycidoxyalkyl groups, 3,4-epoxycyclohexylalkyl groups, and epoxyalkyl groups.

3. The curable silicone composition according to claim 1, wherein the monovalent epoxy-substituted organic groups in component (B) are groups selected from glycidoxyalkyl groups, 3,4-epoxycyclohexylalkyl groups, and epoxyalkyl groups.

4. The curable silicone composition according to claim 1, wherein component (C-2) comprises component (c2).

5. The curable silicone composition according to claim 1, wherein component (C-2) comprises component (c3).

6. The curable silicone composition according to claim 1, wherein a mass ratio of component (C-1): component (C-2) is in a range of from 1:10 to 10:1.

7. The curable silicone composition according to claim 1, further comprising:

(D) an adhesion promoter, in an amount of from about 0.01 to about 5 mass % of the total mass of components (A), (B), (C) and (D).

8. A cured product obtained by curing the curable silicone composition according to claim 1.

* * * * *